May 13, 1924 Re. 15,837

M. HUTCHINSON

WOODWORKING MACHINE

Original Filed Jan. 5, 1918 5 Sheets-Sheet 1

Inventor

By

Attorney

May 13, 1924.

M. HUTCHINSON

WOODWORKING MACHINE

Original Filed Jan. 5, 1918

Re. 15,837

5 Sheets-Sheet 2

Inventor

Machinto Hutchinson

By

Attorney

May 13, 1924. Re. 15,837

M. HUTCHINSON

WOODWORKING MACHINE

Original Filed Jan. 5, 1918 5 Sheets-Sheet 3

Inventor

Mackintosh Hutchinson,

Attorney

May 13, 1924. Re. 15,837

M. HUTCHINSON

WOODWORKING MACHINE

Original Filed Jan. 5, 1918 5 Sheets-Sheet 4

Inventor

By

Attorney

May 13, 1924. Re. 15,837
M. HUTCHINSON
WOODWORKING MACHINE
Original Filed Jan. 5, 1918 5 Sheets-Sheet 5
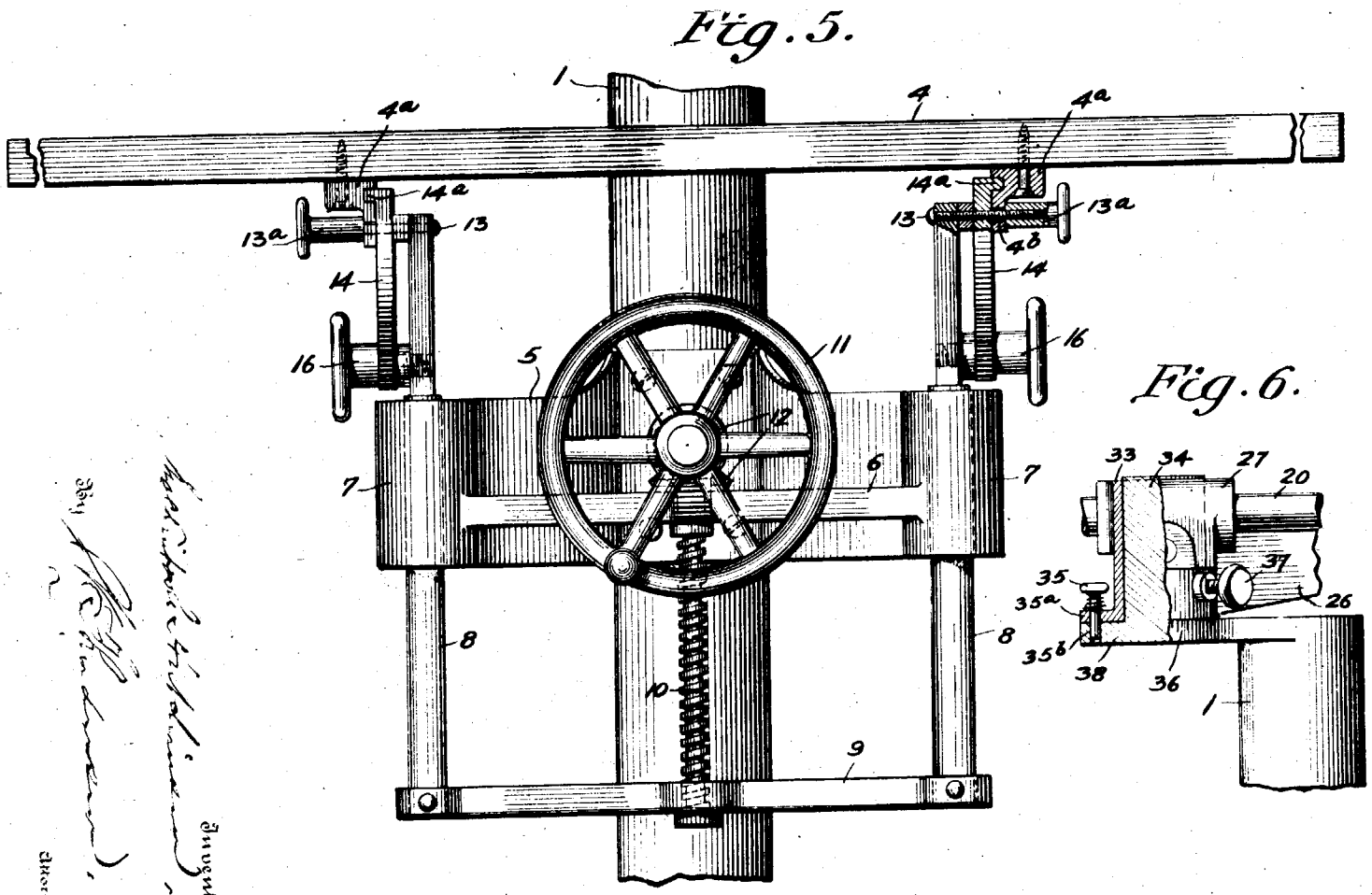
Inventor
By
Attorney Reissued May 13, 1924.

Re. 15,837

UNITED STATES PATENT OFFICE.

MACKINTOSH HUTCHINSON, OF PHILADELPHIA, PENNSYLVANIA.

WOODWORKING MACHINE.

Original No. 1,369,744, dated February 22, 1921, Serial No. 210,470, filed January 5, 1918. Application for reissue filed April 3, 1922. Serial No. 549,303.

*To all whom it may concern:*

Be it known that I, MACKINTOSH HUTCHINSON, a subject of the King of Great Britain, formerly residing at Toronto, in the Province of Ontario, Canada, and now residing at Philadelphia, county of Philadelphia, State of Pennsylvania, have invented certain new and useful Improvements in Woodworking Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to improvements in sawing machines of the general type disclosed in my U. S. Letters Patent No. 1,014,708, wherein a motor driven saw is supported by an upright post or standard in such manner that it can be adjusted forwardly and rearwardly and positioned in different vertical planes radiating from a common axis in order that the machine may be applied to mitering, cross-cutting, dadoing and kindred operations.

The principal objects of the present invention are to enhance the rigidity, compactness and facility of adjustment and operation of a machine of the type referred to; and also to enable the use of the saw driving motor for the operation of some device collaterally useful in the particular work at hand, such for example as a jointer, without the necessity of removing the motor from its support or disturbing its operative relation to the saw.

With the above objects in view the invention consists of certain features of structure and combination, involving the elements for supporting the motor and the saw from the standard or pedestal, and which will be set forth in detail as the description proceeds.

An embodiment of the invention is disclosed in the accompanying drawings, wherein:

Figure 5 is a detail front elevation showing the adjusting mechanism for the work table;

Figure 6 is a detail view, partly in section and partly in side elevation, showing the mounting of the pivotally adjusted supported bracket for the motor and saw.

Similar characters of reference designate corresponding parts throughout the several views.

Figure 1:
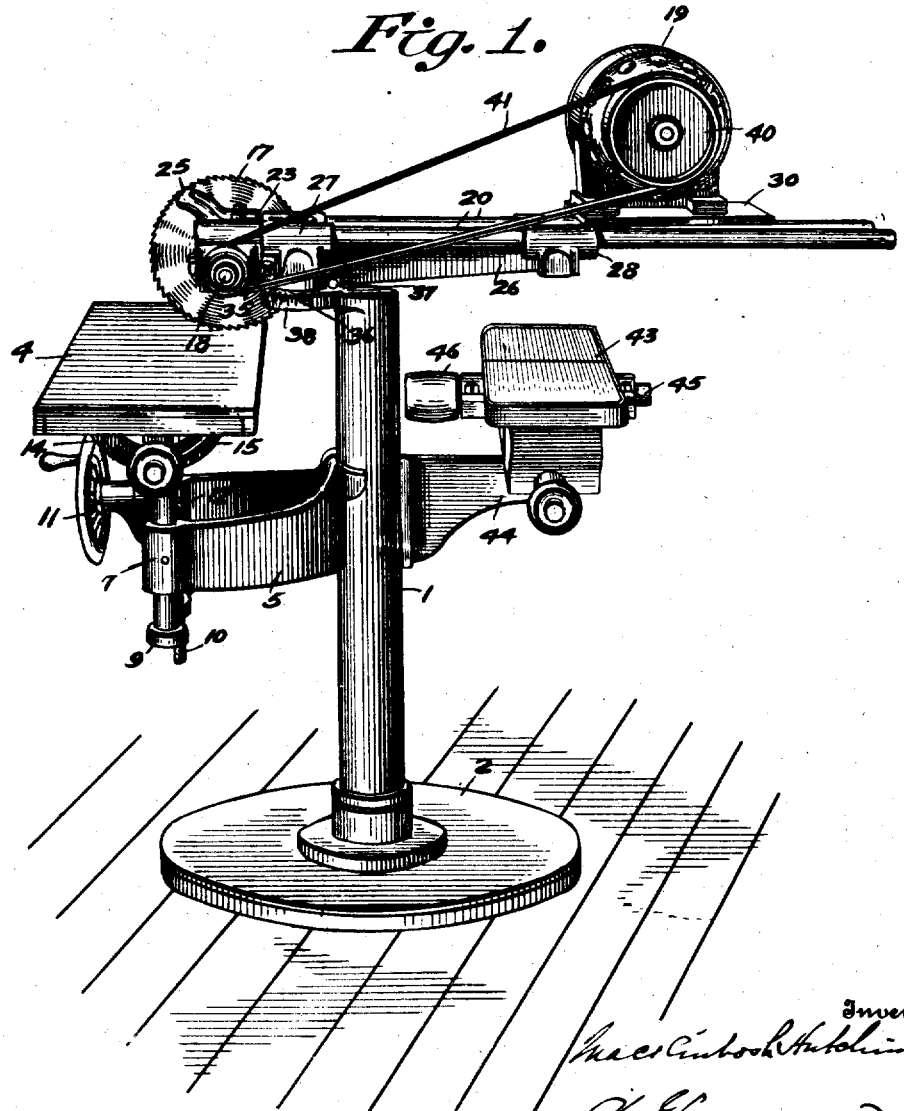
Figure 1 is a side perspective view of a sawing machine, in which the features of the invention are incorporated.

The support of all of the elements of the machine consists essentially of an upright standard or pedestal 1 suitably stayed at its lower end relatively to the floor and for this purpose preferably provided with a supporting base 2 of sufficient width and extent to insure stability.

The stock upon which the saw operates is held on a table 4 whose elevation relative to the saw may be adjusted to regulate the depth of the cut. In the construction shown and preferred the standard 1 is provided with a forwardly projecting bracket 5 terminating in a cross beam 6 (Fig. 5) which, at its ends, is formed with vertical sleeves 7; and the table 4 is secured to a pair of pillars 8 which are slidably mounted in the respective sleeves 7 and are connected at their lower ends by a cross bar 9. The adjustment of the elevation of the table is effected by the rotation of a screw shaft 10 which is threaded through the bar 9 and has a swivel mounting in a suitable bearing formed with or secured to the beam 6. The stem 10 is operated by a hand wheel 11, preferably through the agency of miter gears 12.

In certain operations it may be found desirable to vary the angle of the work relatively to the saw and for this purpose the table 4 is pivotally adjustable about a horizontal or transverse axis, being connected by pivot pins 13 to the upper ends of the pillars 8. In order to secure the table in any position to which it may be adjusted about its pivotal center 13 it is provided with curved bars 14, concentric to said center and having slots 15. The bars 14 are engaged by clamp heads 16 which are formed with suitable hand grips and have shanks passing through the slots 15 and threaded in the pillars 8. When the clamp heads 16 are "backed off" the table 4 may be freely adjusted into any desired position about its pivotal center; and when the adjustment has been made said heads are tightened against the bars 14 and are thereby effective to hold the table against displacement.

The table is also preferably adjustable, in a direction fore and aft of the machine and for such purpose said table is provided with runners $4^a$ which are slidably fitted to bars $14^a$ extending between and secured to the upper ends of each curved bar 14. The pivot stems 13 are fitted centrally in the bars $14^a$ and the runners $4^a$ have longitudinal slots $4^b$ through which the stems 13 project. Said stems are provided with clamp heads $13^a$ which are formed with suitable hand grips and may be tightened against the runners $4^a$ to fix the table against sliding movement and in any desired position within its range of fore and aft adjustment.

For the support of the saw 17 and its transverse shaft 18, as also of the motor 19 for operating the saw, a pair of beams 20 is provided which in turn are supported by the standard 1. The saw shaft 18 is journaled in bearings 21 having elements which are formed as parts of or secured to a cross head 22. The cross-head 22 is formed with sockets 23 in which the front ends of the beams 20 are fitted; and said cross head and beams are held relatively rigid by set screws 24 threaded through said socket and engaging said beams. The cross head 22 is also provided with a handle 25 by which the saw may be advanced or retracted relatively to the work.

In order to vary the angle of the saw relatively to the work the beams 20 are supported by a pivotally mounted element and in order that the saw may be projected or retracted relatively to the work the beams are slidable on their supporting element in the direction of their length and are disposed tangentially of the pivot of said element.

The supporting element for the beams 20 consist of a horizontal bracket 26 provided with a front pair of guide sleeves 27 and a rear pair of guide sleeves 28. The beams are slidably fitted in said sleeves which, in order to facilitate the sliding movement of the beams in either direction are provided with pulleys 29 on which the beams rest, said pulleys being preferably mounted with roller bearings. The pulleys are journaled in the bracket at the base of the sleeves, as shown, and thus relieve the sleeves of some of the strain of the beams. The motor 19 is provided with a base 30 which has depending dowel pins 31 engaging in recesses formed in the beams; and the sleeves 27 and 28 are formed along their upper sides with slots 32 which extend from end to end of said sleeves and through which the pins 31 may move in connection with the sliding of the beams, said slots thus permitting the motor to be moved in either direction past the sleeves. When the saw is retracted its rearward movement is limited by the engagement of the cross head 22 or, more strictly, of the sockets 23 of said cross head against the front sleeves 27. The sleeves 27 and 28 are somewhat widely spaced and therefore provide support for the beams at two distantly located points, the arrangement thus insuring stability. The relatively wide separation of the sleeves 27 and 28 is not permitted to interfere with the compactness of the machine since an amply sufficient range of projection of the saw is provided for with beams of the usual length by the slotting of the sleeves 27 and 28 which enables the motor to be advanced into a position of immediate adjacency to the front of the machine.

The bracket 26 is formed at a suitable point, preferably between the front sleeves 27, with a vertical collar 33 which is rotatably fitted upon a pivot post 34. The post 34 constitutes the axis about which the saw may be turned to vary its angle relatively to the work.

In the preferred construction the post 34 is carried by an upright from the outer end of a horizontal overhanging arm 38 which is rigidly mounted upon the upper end of the standard 1, the post 34 being located at one side of said standard.

The bracket 26 may be secured in any desired position as indicated by a scale 36 provided upon the arm 38 in concentric relation to the collar 33. There are certain prescribed positions in which the saw must be placed for certain operations of frequent recurrence; and in order that the bracket 26 may be quickly adjusted to any of these prescribed positions and positively secured therein, it is preferred to provide a latch pin 35 which is mounted in a lug $35^a$ projecting from the collar 33 and is engageable, selectively, in recesses $35^b$ formed in the arm 38 along a circle concentric to the collar 33. For holding the bracket 26 in positions intermediate the prescribed ones as determined by the location of the recesses $35^b$, the collar 33 is preferably provided with a set screw 37 which may be tightened against the post 34, thereby to frictionally bind said collar against said post.

The shaft of the motor 19 is provided with a pulley 40 which is geared by a belt 41 to a pulley 42 on the saw shaft 18.

The construction above described is such that the motor may be readily employed for the operation of some device collaterally useful in the particular work at hand. Thus, a jointer 43 of any suitable construction and illustration merely conventionally in the drawings is shown as mounted upon a horizontal bracket 44 which is secured to the standard 1, said jointer being located at the side of said standard opposite the table 4 and having its operating shaft 45 provided with a pulley 46. When it is desired to operate the jointer the bracket 26 is turned about its axis 34, the beams 20 swinging with said bracket to a position wherein the pulley 40 alines with the pulley 46 at which time the belt 41 is disconnected from the pulley 42 and engaged over the pulley 46.

Figure 2:
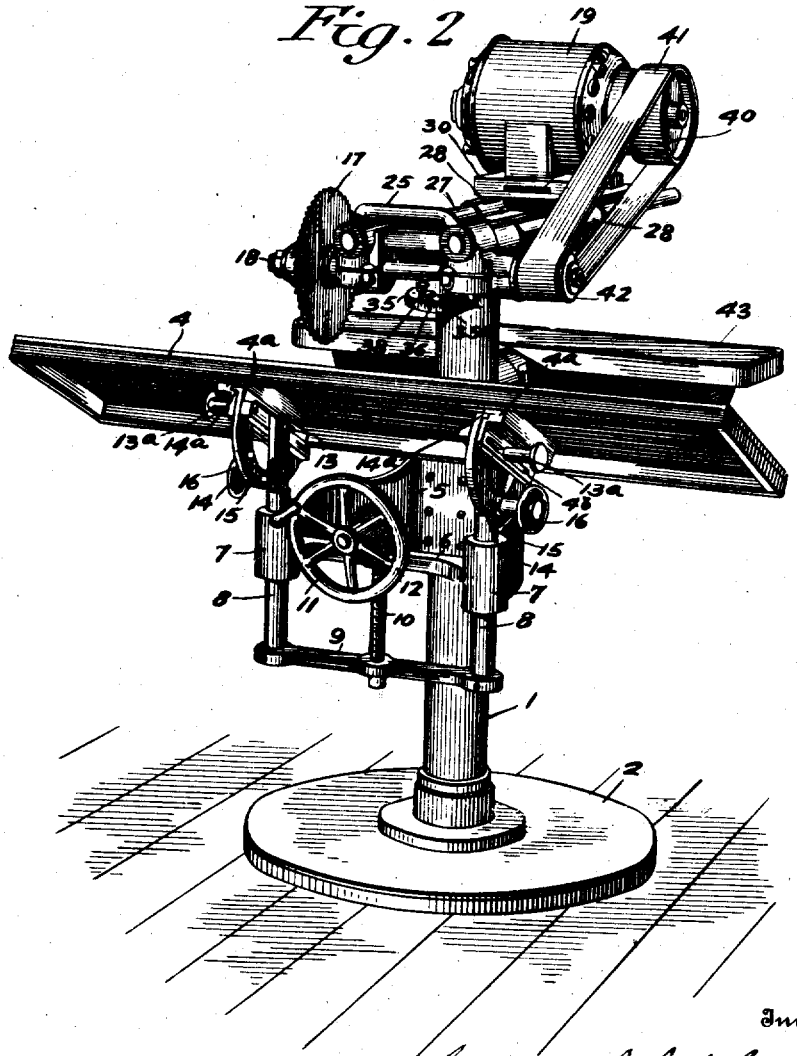
Figure 2 is a front perspective view of the machine.
Figure 3:
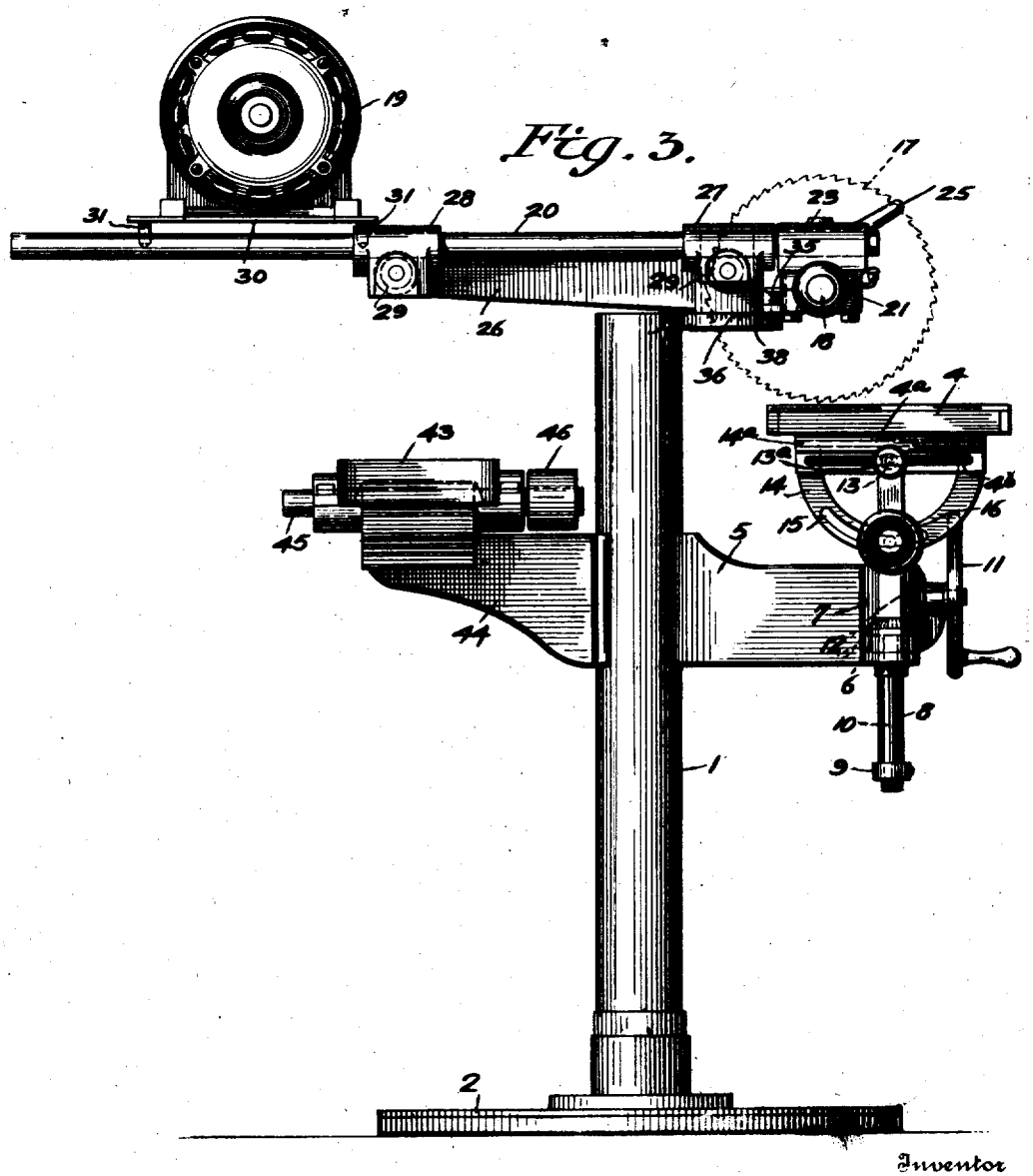
Figure 3 is a side elevation on a somewhat larger scale.
Figure 4:
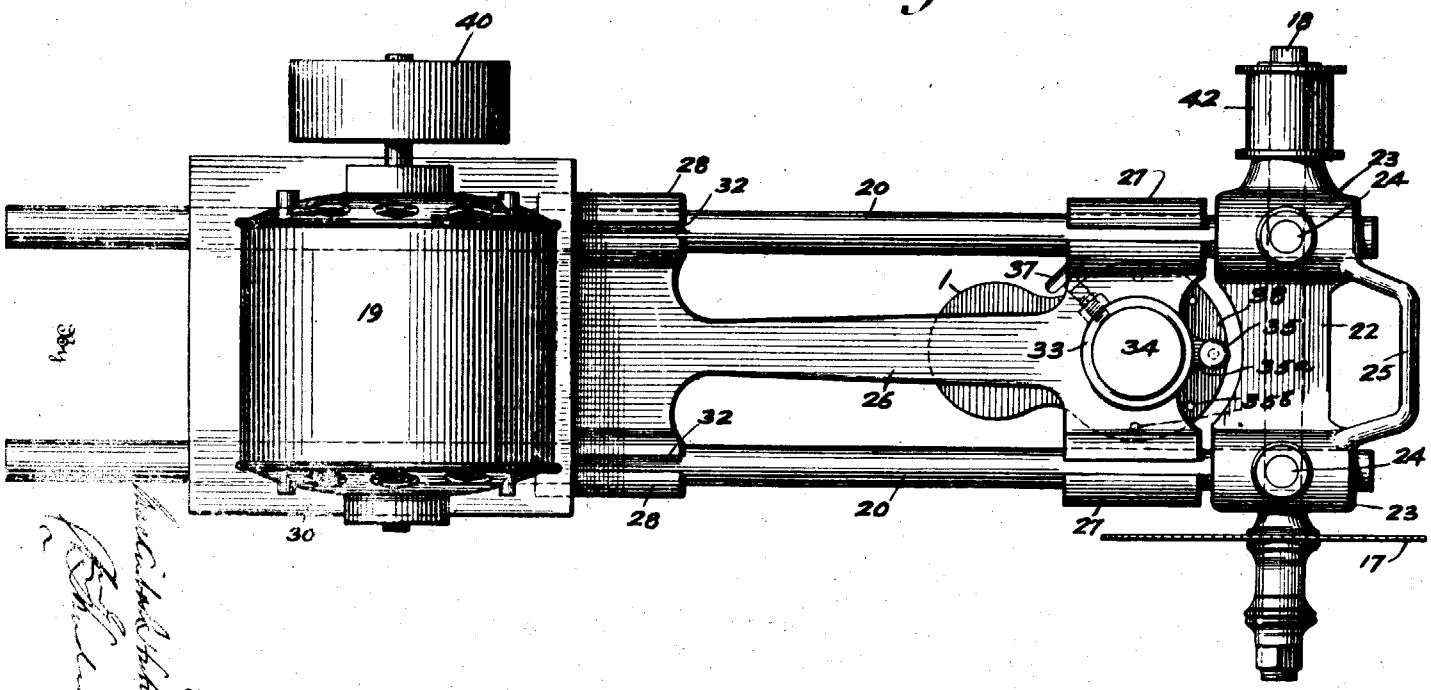
Figure 4 is a plan view.

By providing the overhanging arm 38 for the support of the bracket 26 an advantage is secured in that, when said bracket is, for some special work, e. g., ripping, positioned at a right angle to its normal position shown in Figure 2 greater space is allowed between the saw and the post, thereby enabling the saw to work on wider boards.

Having fully described my invention, I claim:

1. In a machine of the type set forth, an upright standard, a horizontal bracket supported at the upper end of said standard for pivotal movement about a vertical axis and relatively to the standard, said bracket having front and rear pairs of sleeves, a pair of beams fitted in said sleeves for sliding movement in the direction of their length and disposed tangentially of the pivot of said bracket, a cross head fitted on the front ends of said beams, a transverse saw carrying shaft, bearings for said shaft associated with said cross head, a motor supported from the rear ends of said beams and gearing between said motor and the saw carrying shaft.

2. In a machine of the type set forth, an upright standard, a horizontal bracket supported at the upper end of said standard for pivotal movement about a vertical axis, said bracket having front and rear pairs of sleeves, a pair of beams fitted in said sleeves for sliding movement in the direction of their length and disposed tangentially of the pivot of said bracket, said sleeves being provided with pulleys journaled in the bracket at the base of the sleeves and on which said beams rest, a cross head fitted on the front ends of said beams, a transverse saw carrying shaft, bearings for said shaft associated with said cross head, a motor supported from the rear ends of said beams and gearing between said motor and the saw carrying shaft.

3. In a machine of the type set forth, an upright standard, a horizontal bracket supported at the upper end of said standard for pivotal movement about a vertical axis, said bracket having front and rear pairs of sleeves, a pair of beams fitted in said sleeves for sliding movement in the direction of their length and disposed tangentially of the pivot of said bracket, a cross head fitted on the front ends of said beams, a transverse saw carrying shaft, bearings for said shaft associated with said cross head, a motor having its base provided with dowel pins fitted in said beams, the sleeves of the rear pair having slots through which said dowel pins may move in connection with the sliding movement of said beams and gearing between said motor and the saw carrying shaft.

4. In a machine of the type set forth, an upright standard, a horizontal arm mounted in overhanging relation upon the upper end of said standard, a horizontal bracket pivotally mounted upon the outer end of said arm for movement about a vertical axis parallel to said standard, said bracket having front and rear sleeves, a pair of beams fitted in said sleeves for sliding movement in the direction of their length and disposed tangentially of the pivot of said bracket, a cross head fitted on the front ends of said beams, a transverse saw carrying shaft, bearings for said shaft associated with said cross head, a motor supported from the rear ends of said beams and gearing between said motor and the saw carrying shaft.

5. In a machine of the type set forth, an upright standard, a horizontal arm mounted in overhanging relation upon the upper end of said standard, a horizontal bracket pivotally mounted upon said arm for movement about a vertical axis parallel to said standard, a transverse saw carrying shaft, a support for said shaft slidably fitted to said bracket for movement in the direction of its length, and disposed tangentially of the pivot of said bracket, said shaft being mounted at the front end of said support, a motor mounted at the rear end of said support and gearing between said motor and said shaft.

6. In a machine of the type set forth, the combination of a motor, a slidable beam element carrying a tool-shaft, the motor and beam element being mounted for pivotal movement about a vertical axis, a second tool carrying shaft supported independently of the slidable beam element, and means adapted for operatively connecting said motor with said tool carrying shafts.

7. In a machine of the type set forth, an upright standard, a horizontal bracket supported at the upper end of the standard for pivotal movement about a vertical axis, a slidable beam element carrying a motor at one end and a transversely extending saw-shaft at the other end, gearing between said motor and saw carrying shaft, and a work-supporting device positioned at one side of the upright standard and provided with an operating shaft having a pulley positioned to receive a power transmission means extending from the motor shaft when the bracket is turned on its axis to bring the motor shaft opposite the operating shaft of said work-supporting device.

8. In a machine of the type set forth, the combination of a motor, a slidable carriage supporting said motor and provided with a tool-shaft at one end, means upon which said carriage is rotatably mounted, a second tool carrying shaft supported independently of the slidable carriage, and means adapted for operatively connecting said motor with said tool-carrying shafts.

9. In a machine of the type set forth, the combination of a motor, a slidable carriage supporting said motor and provided with a tool shaft at one end, means upon which said carriage is rotatably mounted, a second tool carrying shaft supported independently of the slidable carriage, and means adapted in one arrangement to connect the motor with the tool-shaft on the carriage and in another arrangement to connect the motor with the other tool-shaft.

Signed at Philadelphia, in the county of Philadelphia, State of Pennsylvania, this 31 day of March, 1922.

MACKINTOSH HUTCHINSON.